(12) United States Patent
Mey et al.

(10) Patent No.: US 12,429,139 B2
(45) Date of Patent: Sep. 30, 2025

(54) SELECTOR AND LOCKOUT VALVE MISTAKE-PROOF DESIGN FEATURES

(71) Applicant: KIDDE-FENWAL, LLC, Ashland, MA (US)

(72) Inventors: Steven Mey, Milford, MA (US); Luis Horton, Davenport, FL (US); Anthony Cilluffo, Ashland, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 0 days.

(21) Appl. No.: 18/183,657

(22) Filed: Mar. 14, 2023

(65) Prior Publication Data

US 2023/0341059 A1    Oct. 26, 2023

Related U.S. Application Data

(60) Provisional application No. 63/333,233, filed on Apr. 21, 2022.

(51) Int. Cl.
*F16K 5/06*  (2006.01)
*F16K 27/06* (2006.01)
*F16K 31/60* (2006.01)

(52) U.S. Cl.
CPC .......... *F16K 5/0647* (2013.01); *F16K 27/067* (2013.01); *F16K 31/602* (2013.01)

(58) Field of Classification Search
CPC .... F16K 5/0647; F16K 5/0652; F16K 27/067; F16K 31/05; F16K 31/055; F16K 31/602; F16K 27/06; F16K 27/062; F16K 27/065; F16K 27/12

USPC .......................................... 251/315.06, 315.1
See application file for complete search history.

(56) References Cited

U.S. PATENT DOCUMENTS

| | | | | |
|---|---|---|---|---|
| 4,629,157 A | * | 12/1986 | Tsuchiya | F16K 31/163 137/382.5 |
| 4,719,939 A | * | 1/1988 | Killian | F16K 31/16 137/315.35 |
| 6,206,023 B1 | * | 3/2001 | Landers | F16K 5/0673 137/15.18 |
| 6,302,132 B1 | * | 10/2001 | Lay | F16K 27/067 251/315.1 |

(Continued)

FOREIGN PATENT DOCUMENTS

| | | |
|---|---|---|
| EP | 1672261 A1 | 6/2006 |
| EP | 1418373 B1 | 5/2007 |
| WO | 2006118361 A1 | 11/2006 |

OTHER PUBLICATIONS

European Search Report for European Application No. 23169284.9; Date of Search Aug. 31, 2023; 9 pages.

*Primary Examiner* — Kenneth Rinehart
*Assistant Examiner* — Jonathan J Waddy
(74) *Attorney, Agent, or Firm* — Honigman, LLP

(57) ABSTRACT

Valve assemblies are described having a valve positioner, a ball valve assembly configured to be actuated by the valve positioner between an open state and a closed state, an indicator configured to provide visual indication of the state of the ball valve assembly, and a positioning pin configured between the valve positioner and the ball valve assembly, the positioning pin arranged to prevent installation of the valve positioner to the ball valve assembly in all but one orientation and to ensure installation in only one orientation.

17 Claims, 8 Drawing Sheets

(56) References Cited

U.S. PATENT DOCUMENTS

| | | | | |
|---|---|---|---|---|
| 6,676,109 B2* | 1/2004 | Gomi | ............ | F16K 31/46 |
| | | | | 292/293 |
| 6,959,909 B2* | 11/2005 | Bancroft | ............ | F16K 35/06 |
| | | | | 251/285 |
| 8,740,180 B2* | 6/2014 | Matsushita | ............ | F16K 35/06 |
| | | | | 251/91 |
| 9,010,722 B2* | 4/2015 | Hoots | ............ | F16K 1/2007 |
| | | | | 70/180 |
| 10,384,317 B2* | 8/2019 | Scaramucci | ............ | F16K 27/067 |
| 10,591,080 B2 | 3/2020 | Halimi et al. | | |
| 10,962,993 B2 | 3/2021 | Halimi | | |
| 2012/0068099 A1* | 3/2012 | Sealy | ............ | F16K 31/055 |
| | | | | 251/291 |
| 2014/0264111 A1* | 9/2014 | Porter | ............ | F16K 31/05 |
| | | | | 251/129.03 |
| 2019/0192892 A1* | 6/2019 | Johnson | ............ | A62C 35/13 |
| 2019/0242489 A1* | 8/2019 | Chang | ............ | E03C 1/023 |
| 2020/0347944 A1* | 11/2020 | Lozitsky | ............ | F16K 5/0647 |

* cited by examiner

SELECTOR AND LOCKOUT VALVE MISTAKE-PROOF DESIGN FEATURES

CROSS-REFERENCE TO RELATED APPLICATIONS

This application claims the benefit of U.S. Provisional Application No. 63/333,233, filed Apr. 21, 2023, the disclosure of which is incorporated herein by reference in its entirety.

BACKGROUND

The subject matter disclosed herein generally relates to valves and, more particularly, to design specifications and the installation of selector valves and/or lockout valves.

Piping networks for fire suppression systems typically include valves for controlling, directing, and/or limiting flow through the piping layout. Such valves can include, for example, selector valves and lockout valves. Installation of such valves in their proper orientation is necessary to ensure sufficient coverage of agent during a discharge or complete protection from an ongoing discharge. Additionally, during installation, maintenance, repairs, and/or replacement, a technician may be required to disassemble such valves. Typical selector and lockout valves allow for the valves to be disassembled by a field technician and reassembled in the incorrect orientation. This incorrect installation could result in the visual position indicator on the valve indicating an open orientation while the valve is actually closed, or the visual position indicator indicates a closed orientation while the valve is actually open. These scenarios could lead to insufficient agent coverage during a discharge or failure to suppress the fire due to flow being prevented from reaching the correct location or flow being diverted to an incorrect location. Accordingly, ensuring proper installation and assembly of such valves is important and improvements to assembly features may be advantageous to ensure the valves operate as intended.

SUMMARY

According to some embodiments, valve assemblies are provided. The valve assemblies include a valve positioner, a ball valve assembly configured to be actuated by the valve positioner between an open state and a closed state, an indicator configured to provide visual indication of the state of the ball valve assembly, and a positioning pin configured between the valve positioner and the ball valve assembly, the positioning pin arranged to prevent installation of the valve positioner to the ball valve assembly in all but one orientation and to ensure installation in only one orientation.

In addition to one or more of the features described herein, or as an alternative, further embodiments of the valve assemblies may include that the positioning pin is configured to align the valve positioner to the ball valve assembly in a correct orientation for normal operation.

In addition to one or more of the features described herein, or as an alternative, further embodiments of the valve assemblies may include that the valve positioner is part of a selector valve assembly.

In addition to one or more of the features described herein, or as an alternative, further embodiments of the valve assemblies may include a valve shaft operably connecting the valve positioner to the ball valve assembly.

In addition to one or more of the features described herein, or as an alternative, further embodiments of the valve assemblies may include that the valve shaft is part of the ball valve assembly.

In addition to one or more of the features described herein, or as an alternative, further embodiments of the valve assemblies may include that the valve shaft has a double D-shape in cross-section.

In addition to one or more of the features described herein, or as an alternative, further embodiments of the valve assemblies may include that the valve shaft is configured to threadedly connect to a female aperture of the valve positioner.

In addition to one or more of the features described herein, or as an alternative, further embodiments of the valve assemblies may include that the ball valve assembly comprises a mounting bracket and one or more fasteners configured to secure the valve positioner to the mounting bracket.

In addition to one or more of the features described herein, or as an alternative, further embodiments of the valve assemblies may include that the valve positioner is part of a lockout valve assembly.

In addition to one or more of the features described herein, or as an alternative, further embodiments of the valve assemblies may include that the ball valve assembly comprises a handle for manual actuation thereof.

In addition to one or more of the features described herein, or as an alternative, further embodiments of the valve assemblies may include that the handle is configured to rotate only 90 degrees between the open state and the closed state of the ball valve assembly.

In addition to one or more of the features described herein, or as an alternative, further embodiments of the valve assemblies may include that the valve positioner comprises a mounting bracket and the ball valve assembly comprises a valve bracket, wherein the mounting bracket is configured to be installed onto the valve bracket in only the one orientation.

In addition to one or more of the features described herein, or as an alternative, further embodiments of the valve assemblies may include that the positioning pin is arranged to position the valve bracket relative to the mounting bracket in the one orientation.

In addition to one or more of the features described herein, or as an alternative, further embodiments of the valve assemblies may include that the mounting bracket comprises a first arm and a second arm arranged in a U-shape.

In addition to one or more of the features described herein, or as an alternative, further embodiments of the valve assemblies may include that the first arm comprises a cutaway surface to restrict rotation of a handle to a 90 degree rotation.

In addition to one or more of the features described herein, or as an alternative, further embodiments of the valve assemblies may include that the valve bracket comprises a first recess and a second recess, wherein a handle is rotatable between the first recess and the second recess to securely position the ball valve assembly in the first state and the second state, respectively.

In addition to one or more of the features described herein, or as an alternative, further embodiments of the valve assemblies may include that the valve positioner comprises a position shaft operably coupled to the position indicator at one end and a valve shaft of the ball valve assembly at an opposite end, wherein rotation of the valve shaft causes rotation of the position shaft and change a state of the position indicator.

In addition to one or more of the features described herein, or as an alternative, further embodiments of the valve assemblies may include that the valve positioner is part of a limit switch assembly.

In addition to one or more of the features described herein, or as an alternative, further embodiments of the valve assemblies may include that the valve positioner comprises a position shaft operably coupled to the position indicator at one end and a valve shaft of the ball valve assembly at an opposite end, wherein rotation of the valve shaft causes rotation of the position shaft and change a state of the position indicator.

In addition to one or more of the features described herein, or as an alternative, further embodiments of the valve assemblies may include that the ball valve assembly comprises a handle for manual actuation thereof.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
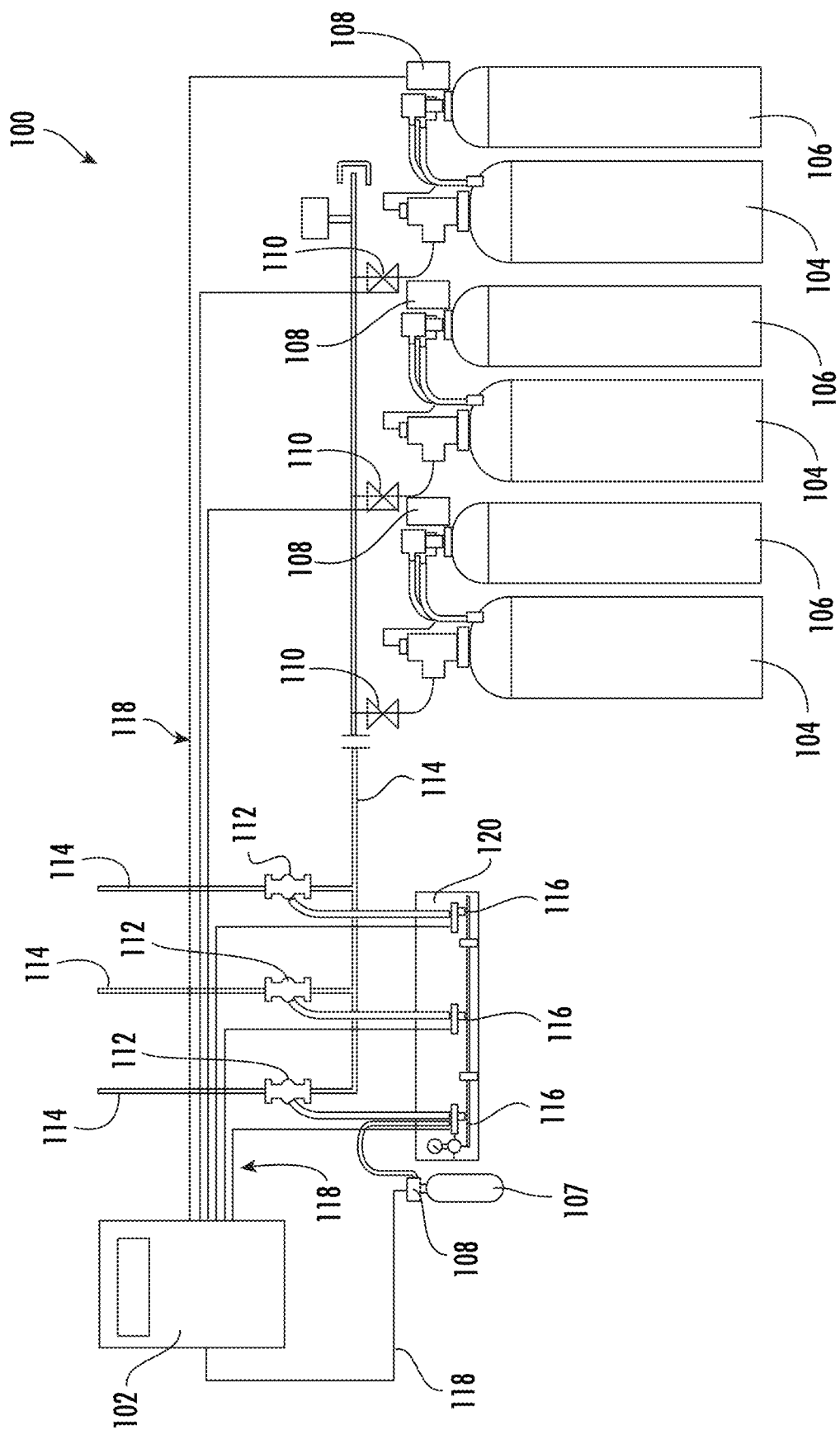
FIG. 1 is a schematic illustration of a typical fire suppression system that may incorporate embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Referring to FIG. 1, a schematic illustration of a typical fire suppression system 100 that may incorporate embodiments of the present disclosure is shown. The fire suppression system 100 includes a control panel 102, one or more agent cylinders 104, one or more pilot cylinders 106, and associated piping 114. The control panel 102 connects to control heads 108 that are attached to the pilot cylinders 106. The control heads 108 are configured to actuate the pilot cylinders 106, which actuate the agent cylinders 104 through flexible hoses or the like.

In operation, fire suppressing agent (e.g., material/fluid) flows through check valves 110 to the piping 114. The flow is directed by valves 112 (e.g., selector valves and/or lockout valves). The valves 112 are configured to open or close depending upon a signal received from the control panel 102 through wiring 118 to the control heads 108, a small pilot cylinder 107, and/or solenoids 116. The solenoids 116, as shown, are mounted to a backplate manifold 120. The small pilot cylinder 107 is configured to supply pressure to the solenoids 116, which open the valves 112 and directs flow therethrough.

In accordance with embodiments of the present disclosure, the valves 112 may be check valves, one-way valves, solenoid valves, selector valves, and/or lockout valves. Some of the valves may be pneumatically actuated and/or electronically actuated, as will be appreciated by those of skill in the art. The selector valves and/or lockout valves may include visual position indicators to indicate the state, position, or orientation of the valve. For example, such valves may include a rotatable ball valve that can be rotated between an open state and a closed state. Because the ball valve will be arranged within a flow line, a separate visual indicator on the external housing of the valve may be required to indicate the state/orientation of the valve to a technician.

Installation of these valves 112 in a proper orientation is necessary to ensure the desired fire hazard protection from the cylinders 104 through the piping 114. Additionally, during installation, maintenance, repairs, and/or replacement, a technician may be required to disassemble such valves 112. Typical selector and lockout valves allow for the valves to be disassembled by a field technician and reassembled in the incorrect orientation due to the symmetric nature of various components and features thereof. This incorrect installation could result in the visual position indicator of the valve indicating an open orientation while the valve is actually closed, or the visual position indicator indicates a closed orientation while the valve is actually open. These scenarios could lead to insufficient agent coverage during a discharge or failure to suppress the fire due to flow being prevented from reaching the correct location or flow being diverted to an incorrect location. Accordingly, ensuring proper installation and assembly of such valves is important and improvements to assembly features may be advantageous to ensure the valves operate as intended.

Figure 2A:
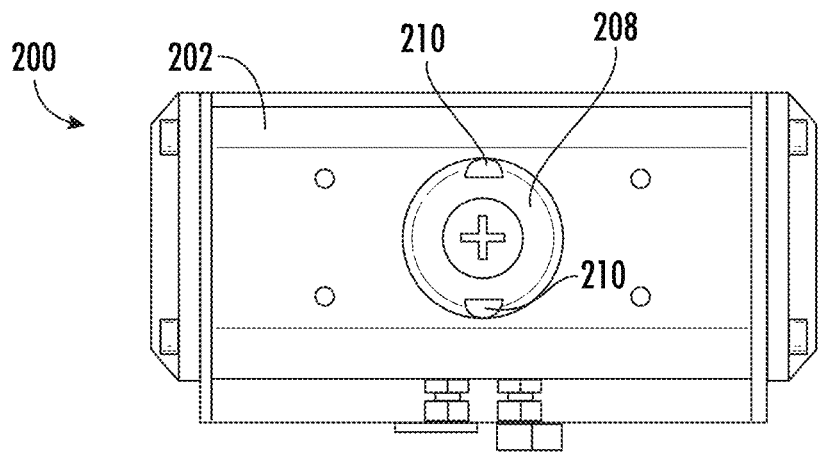
FIG. 2A is top down schematic illustration of an exemplary selector valve assembly in accordance with an embodiment of the present disclosure.
Figure 2B:
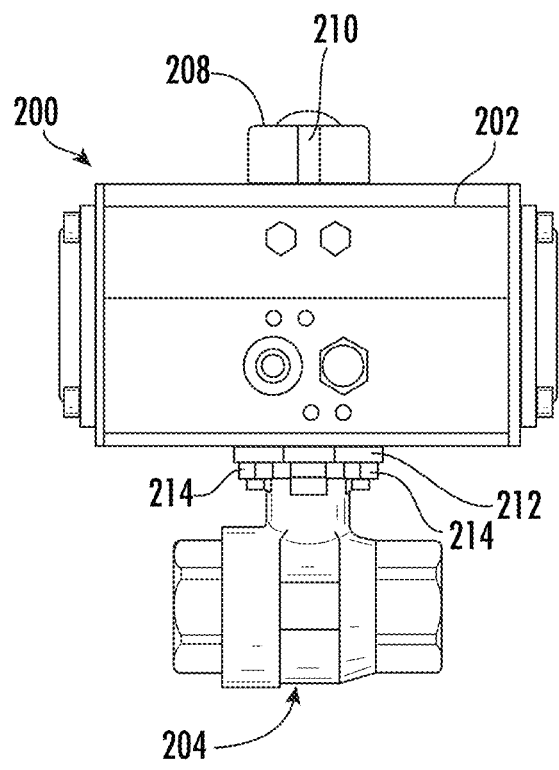
FIG. 2B is a front elevation view of the selector valve assembly of FIG. 2A.
Figure 2C:
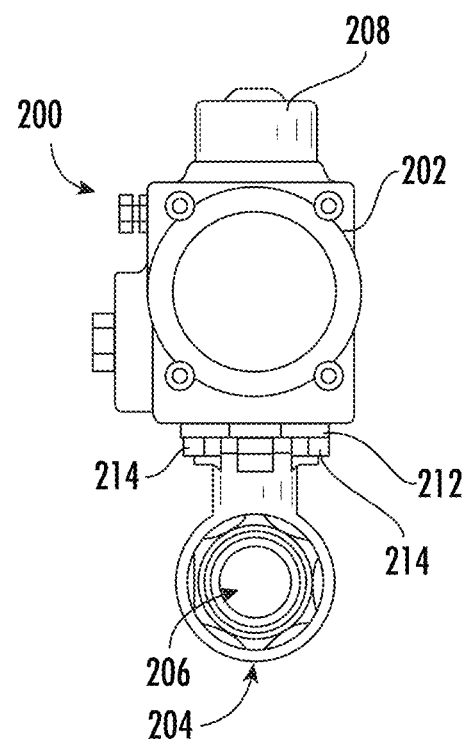
FIG. 2C is a side elevation view of the selector valve assembly of FIG. 2A.

Referring to FIGS. 2A-2D, schematic illustrations of a valve assembly 200 in accordance with an embodiment of the present disclosure are shown. In this illustrative configuration, the valve assembly 200 is configured as a selector valve assembly. The valve assembly 200 may be used in a fire suppression system to control fluid flow through a pipe or other conduit, such as shown and described above. The valve assembly 200 includes a valve positioner 202 and a ball valve assembly 204. In this embodiment, the valve positioner 202 is arranged as a valve actuator. The valve positioner 202 may include various components for controlling operation of the ball valve assembly 204, and specifically the orientation of the ball valve assembly 204. FIGS. 2A-2C illustrate the valve assembly 200 in an open state, with a full-bore 206 illustrated in FIG. 2C through the ball valve assembly 204. The valve positioner 202 may include, for example, electronic and/or pneumatic components that are configured to control the orientation of the ball (e.g., open or closed) within the ball valve assembly 204.

As shown in FIGS. 2A-2C, and as noted above, the valve assembly 200 is in the open state. However, when piping is connected to the ball valve assembly 204, it is not possible to visually inspect the state of the ball within the ball valve assembly 204. As such, the valve positioner 202 includes a position indicator 208. The position indicator 208 includes an indicator element 210 that is arranged to correspond to the position of the ball within the ball valve assembly 204. The valve positioner 202 is coupled to the ball valve assembly 204 by a mounting bracket 212 by one or more fasteners 214.

Figure 2D:
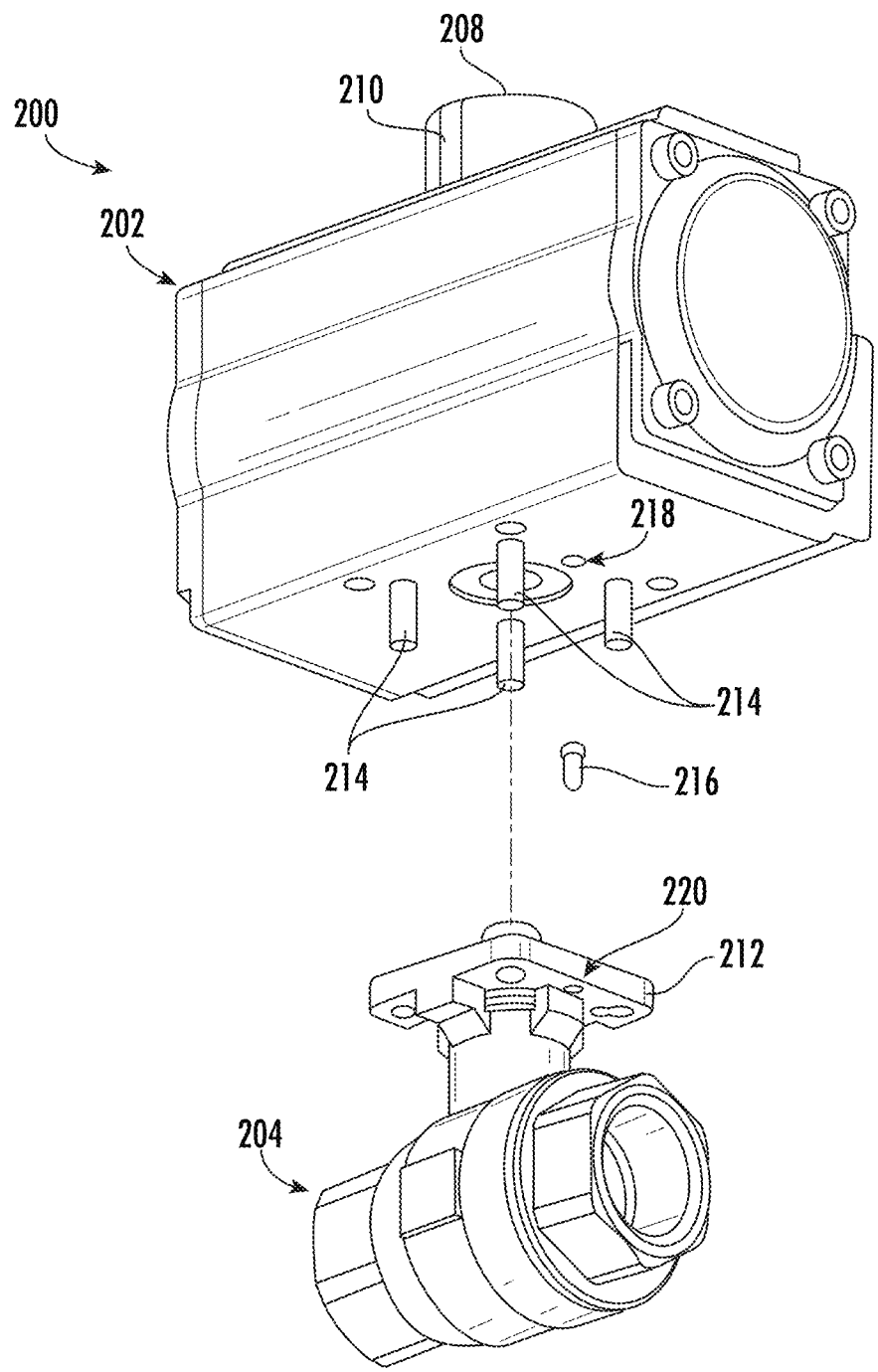
FIG. 2D is an exploded view of the components of the selector valve assembly of FIG. 2A.

Referring to FIG. 2D, the valve positioner 202 is shown separated from the ball valve assembly 204. During installation, assembly, and/or maintenance, the valve positioner 202 may be separated from the ball valve assembly 204, and then must be reinstalled thereto. Because of the nature of the mounting bracket 212, different orientations are possible. That is, the mounting bracket 212 is substantially symmetric and thus can be installed in various different orientations between the valve positioner 202 and the ball valve assembly 204. The mounting bracket 212 may be integrally formed with or part of the ball valve assembly 204. In other embodiments, the mounting bracket 212 may be integrally formed with or part of the valve positioner 202. If the orientation of the valve positioner 202 relative to the ball valve assembly 204 is not properly set when connecting the two components, then the indicator element 210 of the indicator 208 may not accurately represent the orientation of the ball within the ball valve assembly 204.

To prevent improper installation, the valve assembly 200 includes a positioning pin 216 that is insertable into the valve positioner 202 and the mounting bracket 212. In some embodiments, and as shown, the valve positioner 202 may include a positioning aperture 218 for receiving the positioning pin 216. Similarly, in some embodiments, the mounting bracket 212 may include a positioning aperture 220 for receiving the positioning pin 216. The positioning apertures 218, 220 are single apertures on each of the respective components and ensure that only one orientation is possible during an installation process. That is, to install the positioning pin 216, the two positioning apertures 218, 220 must be aligned. If the positioning apertures 218, 220 are not aligned (e.g., due to incorrect relative orientation between the valve positioner 202 and the ball valve assembly 204), then the valve positioner 202 cannot be mounted to the ball valve assembly 204. Stated another way, the positioning pin 216 and the positioning apertures 218, 220 ensure that there is only one possible relative orientation for installation of the valve positioner 202 to the ball valve assembly 204.

Although shown as the positioning pin 216 being separate from each of the valve positioner 202 and the mounting bracket 212 (or ball valve assembly 204), such configuration is not to be limiting. For example, in some embodiments, the positioning pin may be integrally formed or part of the mounting bracket 212 or integrally formed or part of the valve positioner 202. In such configurations, the other component (e.g., valve positioner or mounting plate) may include a positioning aperture for receiving the positioning pin.

Figure 3A:
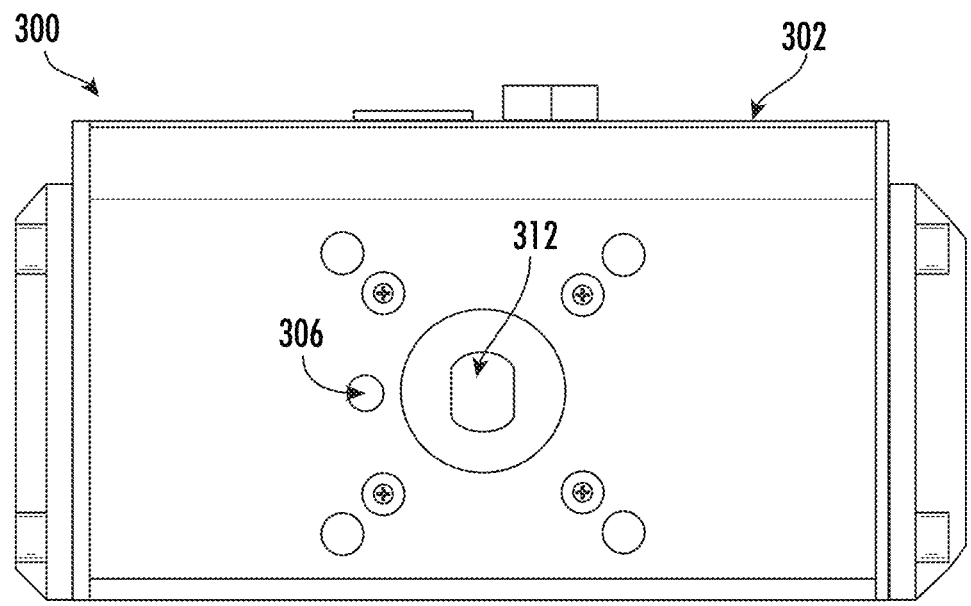
FIG. 3A is a bottom view of an exemplary valve positioner of a selector valve assembly in accordance with an embodiment of the present disclosure.
Figure 3B:
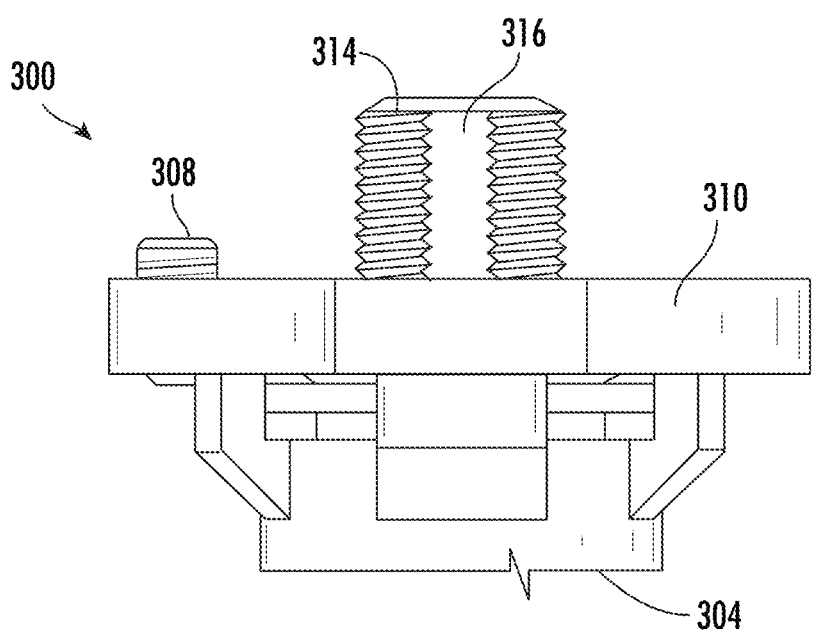
FIG. 3B is a side elevation view of a portion of a ball valve that connects to the valve positioner of FIG. 3A.
Figure 4A:
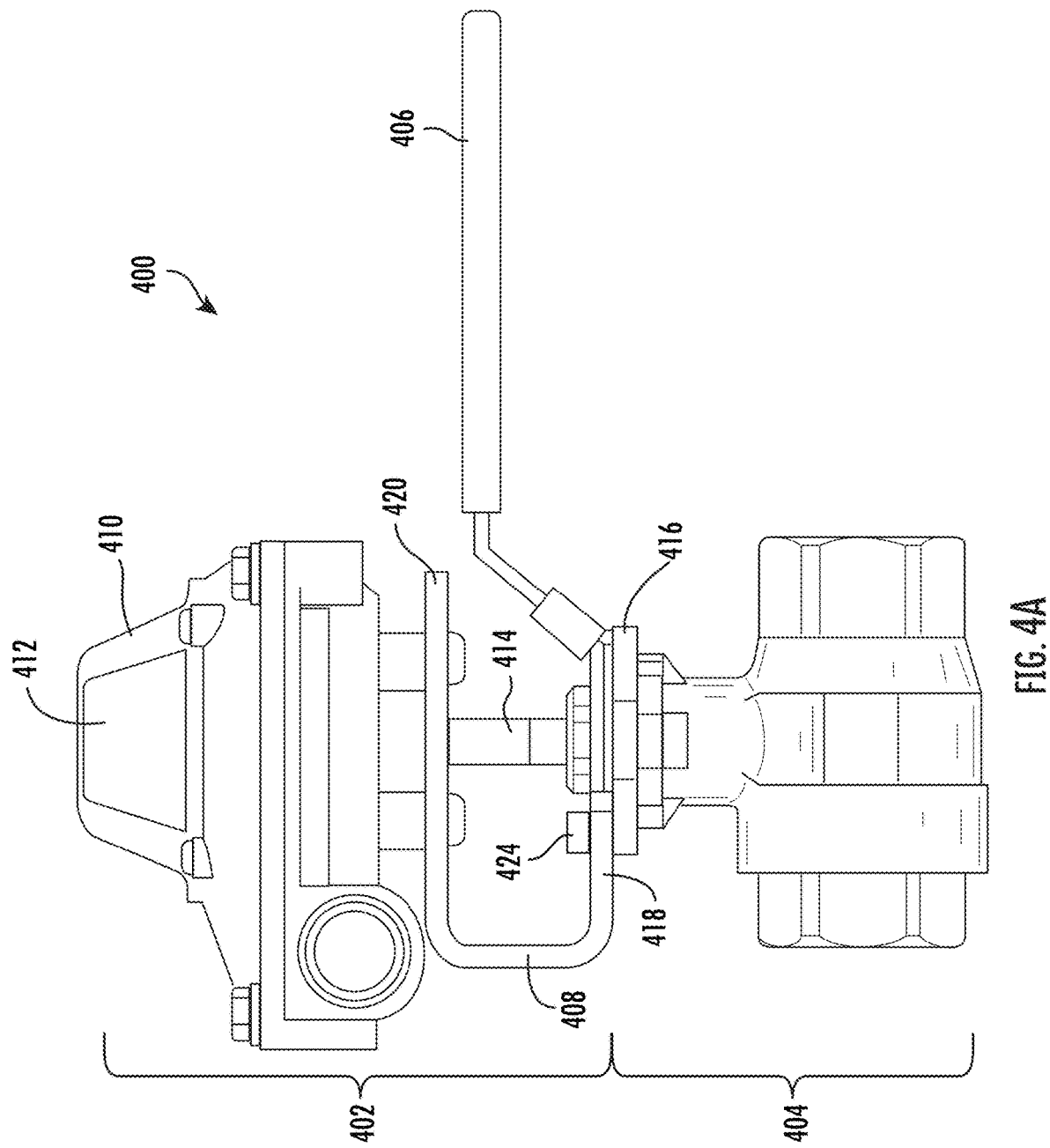
FIG. 4A is a schematic illustration of an exemplary lockout valve assembly in accordance with an embodiment of the present disclosure.
Figure 4B:
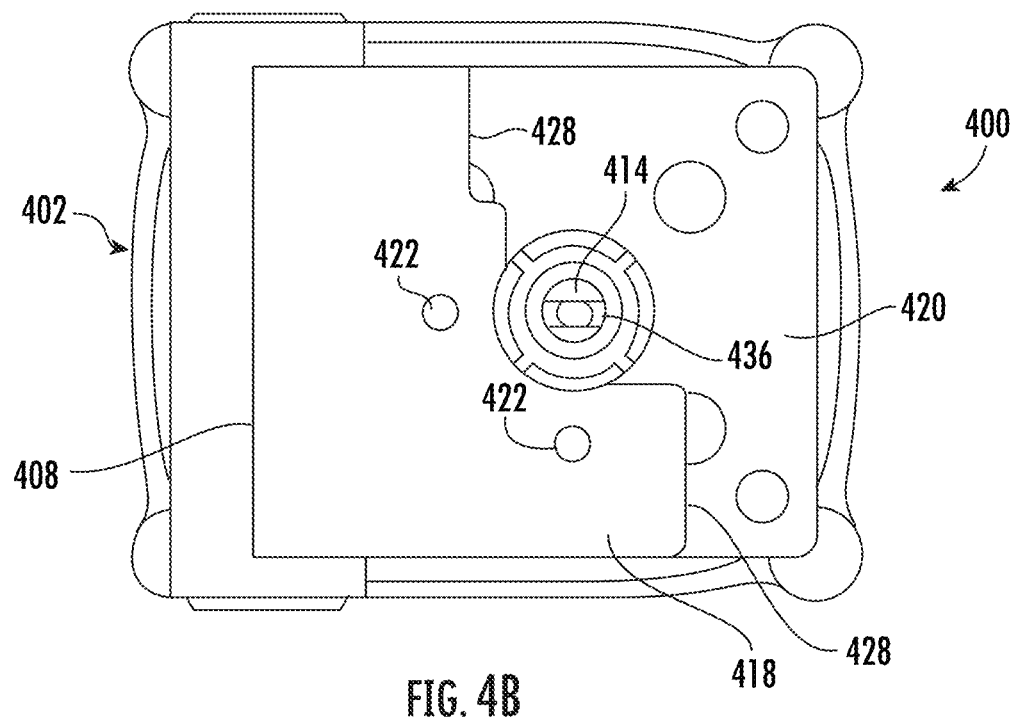
FIG. 4B is a bottom view of a valve positioner of the lockout valve assembly of FIG. 4A.
Figure 4C:
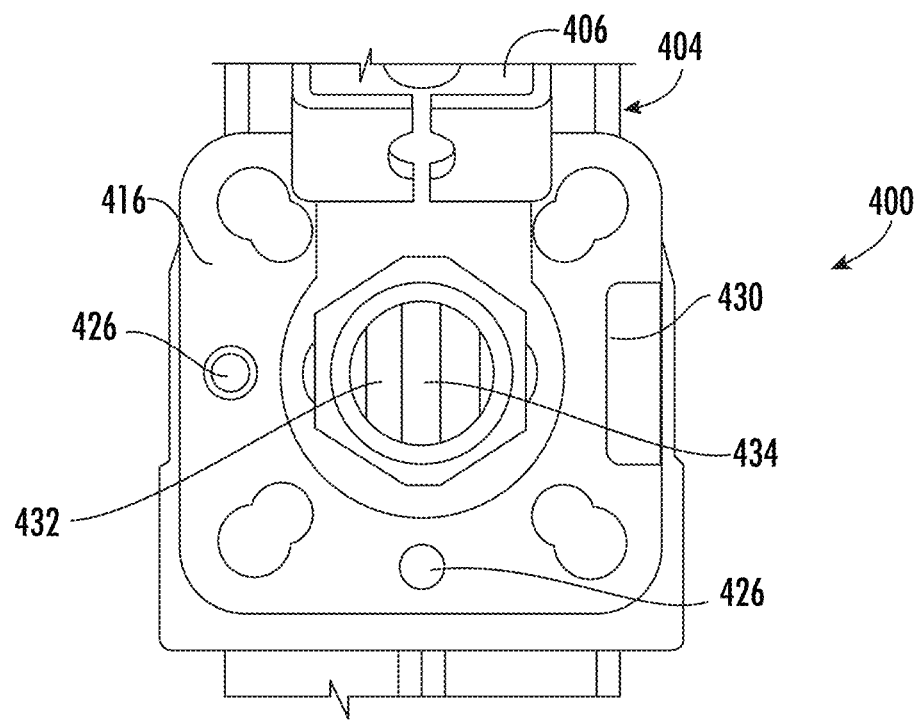
FIG. 4C is a top view of a portion of a ball valve of the lockout valve assembly of FIG. 4A.
Figure 4D:
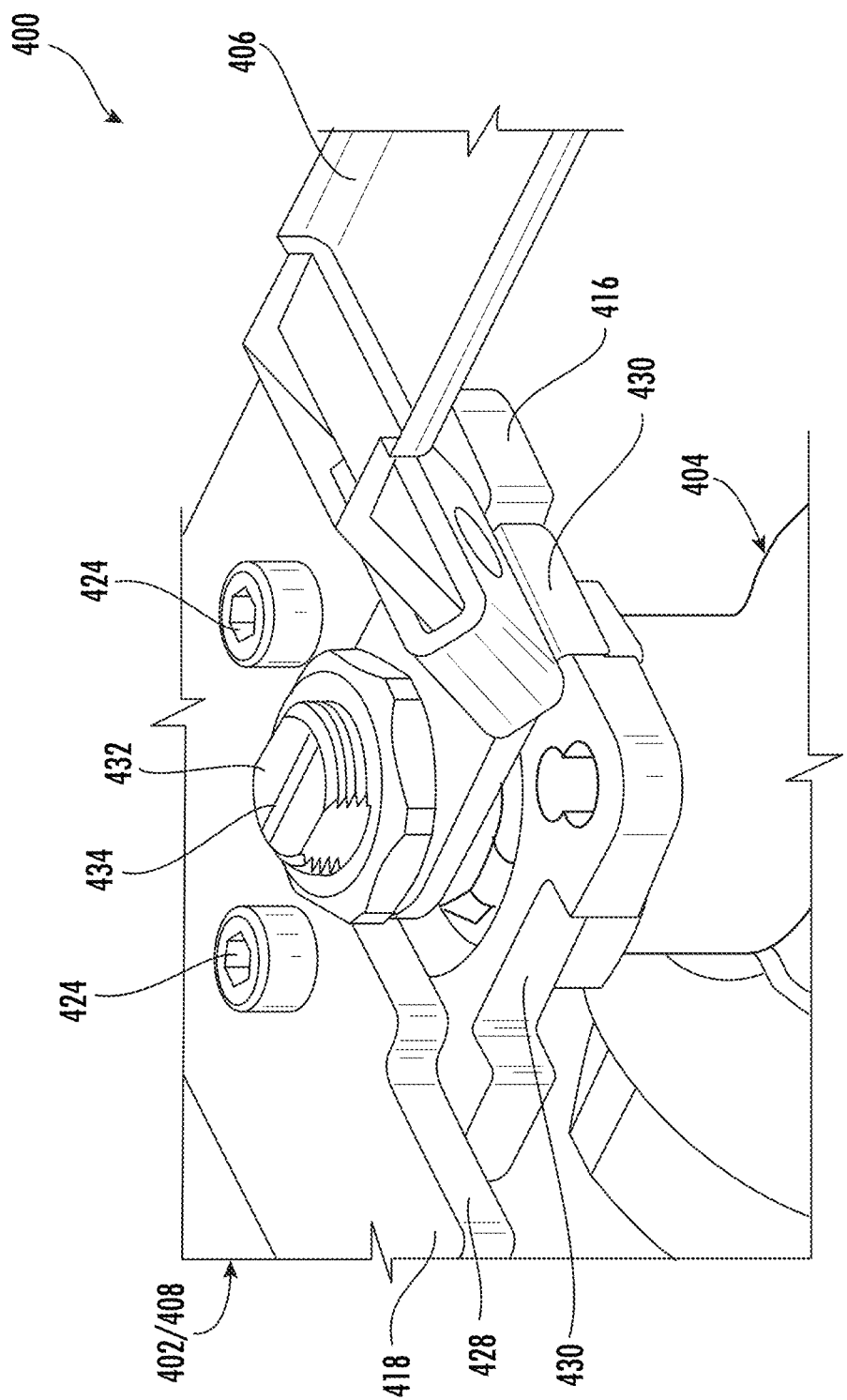
FIG. 4D is an enlarged illustration of a connection between a ball valve and a valve positioner of the lockout valve assembly of FIG. 4A.
Figure 4E:
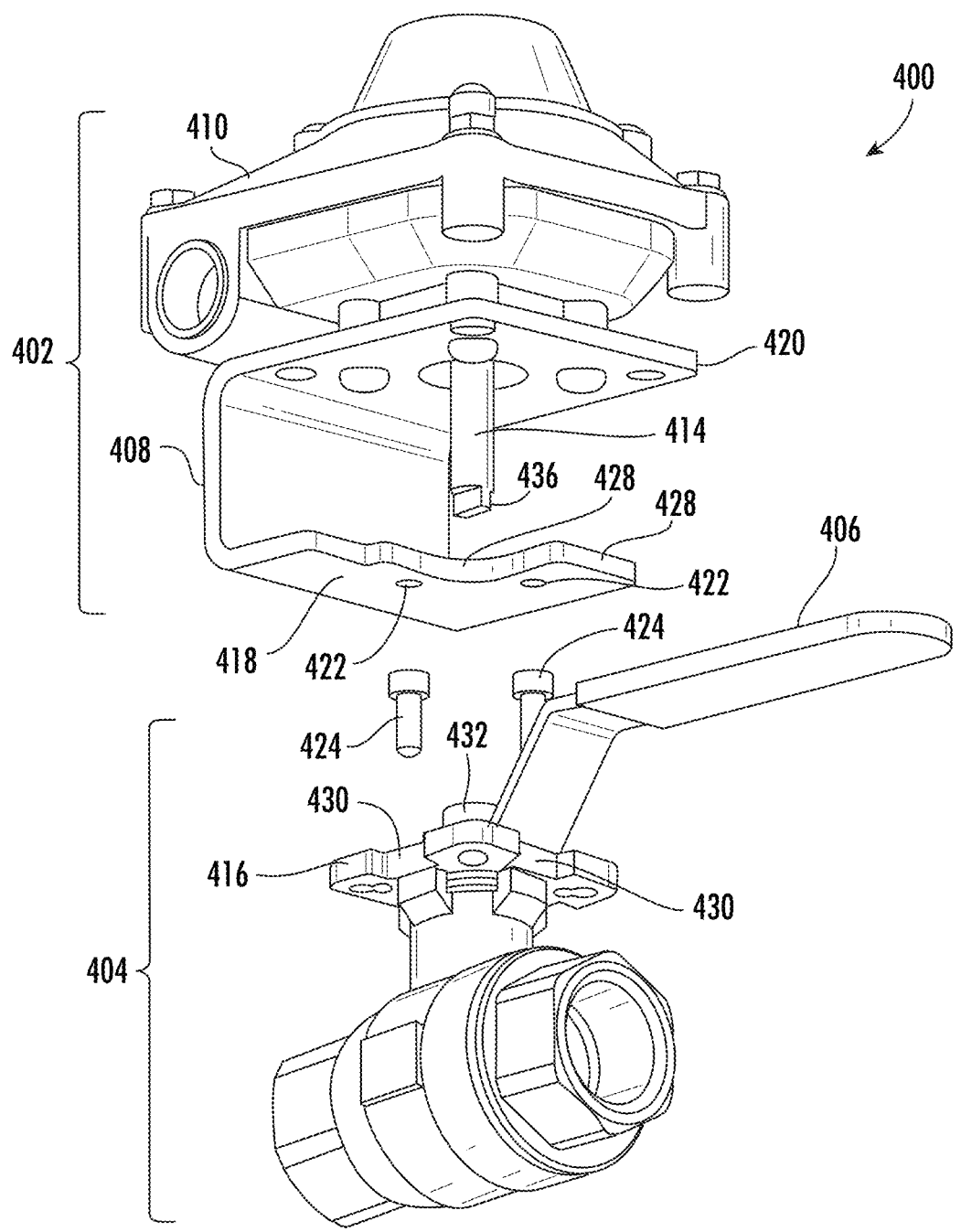
FIG. 4E is an exploded view of the components of the lockout valve assembly of FIG. 4A.

Referring now to FIGS. 3A-3B, schematic illustrations of a valve assembly 300 in accordance with an embodiment of the present disclosure are shown. In this illustrative configuration, the valve assembly 300 is configured as a selector valve assembly, similar to that shown and described with respect to FIGS. 2A-2D. The valve assembly 300 includes a valve positioner 302 (FIG. 3A) and a ball valve assembly 304 (FIG. 3B). The valve positioner 302 is arranged as a valve actuator and may include various components for controlling operation of the ball valve assembly 304, and specifically the orientation of the ball valve assembly 304. The valve positioner 302 may include, for example, electronic and/or pneumatic components that are configured to control the orientation of the ball (e.g., open or closed) within the ball valve assembly 304.

In this configuration, the valve positioner 302 includes a positioning aperture 306 for receiving a positioning pin 308. The positioning pin 308 of this embodiment is part of or installed to a mounting bracket 310. The positioning pin 308 and positioning aperture 306 are configured to ensure proper installation of the valve positioner 302 to the mounting bracket 310 of the ball valve assembly 304. In this embodiment, an additional feature is provided for ensuring proper orientation between the valve positioner 302 and the ball valve assembly 304. For example, as shown in FIG. 3A, the valve positioner 302 may include a female aperture 312 and the mounting bracket 310 may include a valve shaft 314. The valve shaft 314 includes one or more flat sides 316 and thus forms a substantially D-shape or double-D-shape to be received within the female aperture 312. This arrangement ensures specific orientation between the components. Further, the flat sides 316 may provide surface(s) upon which the valve positioner 302 can act to rotate the valve shaft 314. The valve shaft 314 may be operably coupled to the ball of the ball valve assembly 304 such that rotation of the valve shaft 314 causes rotation of the ball to open or close the ball valve assembly 304.

Referring now to FIGS. 4A-4E, schematic illustrations of a valve assembly 400 in accordance with an embodiment of the present disclosure are shown. In this illustrative configuration, the valve assembly 400 is configured as a lockout valve assembly. The valve assembly 400 may be used in a fire suppression system to control fluid flow through a pipe or other conduit, such as shown and described above. The valve assembly 400 includes a valve positioner 402 and a ball valve assembly 404. The valve positioner 402, in this embodiment, is arranged as a limit switch. In this configuration of a lockout valve assembly, the valve positioner 402 is configured to be manually operated using a handle 406. By rotating the handle 406, a ball within the ball valve assembly 404 may be rotated to open or close the valve assembly 400.

The valve positioner 402 includes a mounting bracket 408 and a position indicator 410. The position indicator 410 includes an indicator element 412 that indicates a status or state of the ball valve assembly 404. To provide such indication, a position shaft 414 is coupled to the position indicator 410 at one end and to the handle 406 and/or the ball valve assembly 404 at an opposite end. Accordingly, when the ball is rotated within the ball valve assembly 404 (e.g., by rotation of the handle 406) the position shaft 414 will rotate and change the indication provided by the indicator element 412.

To mount the valve positioner 402 to the ball valve assembly 404, the mounting bracket 408 of the valve positioner 402 is attached to a valve bracket 416 of the ball valve assembly 404. In this illustrative configuration, the mounting bracket 408 includes a first arm 418 and a second arm 420 arranged in a substantially U-shape with the position shaft 414 extending therebetween. The first arm 418 includes one or more fastener apertures 422 for receiving fasteners 424 therethrough. The valve bracket 416 of the ball valve assembly 404 includes corresponding fastener apertures 426 to receive the fasteners 424 and connect the mounting bracket 408 to the valve bracket 416. In this embodiment, there are two fastener apertures 422, 426 on each of the mounting bracket 408 and the valve bracket 416 and are arranged in relation to each other such that only one orientation of the mounting bracket 408 to the valve bracket 416 is possible.

The first arm 418 of the mounting bracket 408 also includes a cut-away surface 428 that defines a cut-out in the geometry of the shape of the first arm 418. The cut-away in the first arm 418 is shaped to allow operation of the handle 406 and limit the rotation thereof to a substantially 90° rotation. That is, the first arm 418 and the cutaway surface 428 are configured to limit the rotation of the handle 406. Additionally, the valve bracket 416 includes recesses 430 for receiving a portion of the handle 406 to lock the position of the handle 406 in place relative to the valve bracket 416. The handle 406 of the ball valve 404 is configured to operably couple to a valve shaft 432 that allows for manual rotation of the ball of the ball valve assembly 404. The valve shaft 432 includes a slot 434 on the visible end thereof that is configured to receive a tab 436 of the position shaft 414. As such, when the valve shaft 432 is rotated by actuation of the handle 406, the position shaft 414 will also rotate causing a change of state of the indicator element 412 of the position indicator 410. The valve shaft 432 may have a D-shape or double-D-shape, similar to that shown and described above with respect to FIGS. 3A-3B Because of the inclusion of the cutaway surface 428, the recesses 430, and the fastener apertures 422, 426 on each of the mounting bracket 408 and the valve bracket 416, the fasteners 424 may operate similar to the positioning pin shown and described above. As such, in some embodiments, the fasteners 424 illustratively shown as discrete or separate fasteners, could be incorporated into one of the valve bracket 416 or the mounting bracket 408, with the other component having receiving holes or apertures for receiving the positioning pins and secure the mounting bracket to the valve bracket.

In accordance with embodiments of the present disclosure valve assemblies are configured to include a positioning pin and/or D-shaped shaft as an added safety feature. The combination of the positioning pin and the D-shaped shaft prevents the valve assemblies from being assembled or installed in an incorrect orientation. As shown above, this may be applied to both selector valves (e.g., FIGS. 2A-2D, 3A-3B) and lockout valves (e.g., FIGS. 4A-4E). In the case of selector valves, and in accordance with some non-limiting embodiments, a positioning pin and Double-D shaft may be added as safety features thereto. The combination of the positioning pin and the Double-D shaft prevents the selector valve body and actuator from being assembled or installed in an incorrect orientation. In the case of lockout valves, such configurations, in accordance with some embodiments of the present disclosure, and without limitation, may include a positioning pin, a Double-D valve shaft, and a handle locking tool. The combination of the bracket holes in the limit switch and valve body, the handle locking tool, and the Double-D shaft constrains the handle to a 90-degree rotation and prevents the valve and limit switch assemblies from being installed in an incorrect orientation.

Advantageously, embodiments described herein provide for improved valve assemblies for fire suppression systems that includes mistake-proof assembly and installation features. The mistake-proof features ensure that when a technician installs and/or performs repairs or maintenance upon a valve of the fire suppression system the valve will be reassembled correctly and thus avoid issues related to improper installation of such valves and/or use of such valves in fire suppression systems.

The use of the terms "a", "an", "the", and similar references in the context of description (especially in the context of the following claims) are to be construed to cover both the singular and the plural, unless otherwise indicated herein or specifically contradicted by context. The modifier "about" or "substantially" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A valve assembly for use in a fire suppression system, the fire suppression system including a piping system including a plurality of pipes for providing fluid from a plurality of cylinders, the valve assembly operable to control the flow of fluid from the plurality of cylinders, the valve assembly comprising:
a valve positioner;
a ball valve assembly fluidly connected to one of the plurality of pipes and configured to control the supply of fluid to a corresponding one of the plurality of pipes;
a position indicator; and a positioning pin; wherein
the ball valve assembly is configured to be actuated by the valve positioner between an open state and a closed state so as to provide and shut off fluid, the ball valve assembly including a valve bracket comprising a single first positioning aperture and a pair of first through-holes, wherein the first positioning aperture is disposed between the pair of first through-holes;
the position indicator configured to provide visual indication of the state of the ball valve assembly;

the valve positioner including a single second positioning aperture, and a pair of second through-holes, wherein the second positioning aperture is disposed between the pair of second through-holes; and a pair of fasteners configured to be seated within the pair of first through-holes and the second through-holes, wherein the positioning pin is configured to be seated in the first positioning aperture and the second positioning aperture so as to prevent installation of the valve positioner to the ball valve assembly in all but one orientation and to ensure installation in only one orientation.

2. The valve assembly of claim 1, wherein the positioning pin is configured to align the valve positioner to the ball valve assembly in a correct orientation for normal operation.

3. The valve assembly of claim 1, wherein the valve positioner and the ball valve assembly define a selector valve assembly.

4. The valve assembly of claim 3, further comprising a valve shaft operably connecting the valve positioner to the ball valve assembly.

5. The valve assembly of claim 4, wherein the valve shaft is part of the ball valve assembly.

6. The valve assembly of claim 4, wherein the valve shaft has a double D-shape in cross-section.

7. The valve assembly of claim 4, wherein the valve shaft is configured to threadedly connect to a female aperture of the valve positioner.

8. The valve assembly of claim 1, wherein the valve positioner and the ball valve assembly define a lockout valve assembly.

9. The valve assembly of claim 8, wherein the ball valve assembly comprises a handle for manual actuation thereof.

10. The valve assembly of claim 9, wherein the handle is configured to rotate only 90 degrees between the open state and the closed state of the ball valve assembly.

11. The valve assembly of claim 8, wherein the valve positioner comprises a position shaft operably coupled to the position indicator at one end and a valve shaft of the ball valve assembly at an opposite end, wherein rotation of the valve shaft causes rotation of the position shaft and changes a state of the position indicator.

12. The valve assembly of claim 1, wherein the valve positioner comprises a mounting bracket, wherein the mounting bracket comprises a first arm and a second arm arranged in a U-shape.

13. The valve assembly of claim 12, wherein the first arm comprises a cutaway surface to restrict rotation of a handle to a 90 degree rotation.

14. The valve assembly of claim 1, wherein the valve bracket comprises a first recess and a second recess, wherein a handle is rotatable between the first recess and the second recess to securely position the ball valve assembly in a first state and a second state, respectively.

15. The valve assembly of claim 1, wherein the valve positioner is a limit switch assembly.

16. The valve assembly of claim 15, wherein the valve positioner comprises a position shaft operably coupled to the position indicator at one end and a valve shaft of the ball valve assembly at an opposite end, wherein rotation of the valve shaft causes rotation of the position shaft and changes a state of the position indicator.

17. The valve assembly of claim 15, wherein the ball valve assembly comprises a handle for manual actuation thereof.

* * * * *